3,598,887
PREPARATION OF BLOCK COPOLYMERS
Jules Darcy, Yung-Kang Wei, and Robert C. MacKenzie, Sarnia, Ontario, Canada, assignors to Polymer Corporation Limited, Sarnia, Ontario, Canada
No Drawing. Filed Dec. 23, 1966, Ser. No. 604,165
Claims priority, application Canada, Feb. 26, 1966, 953,311
Int. Cl. C08d 5/02; C08f 1/88, 15/04
U.S. Cl. 260—879                      3 Claims

ABSTRACT OF THE DISCLOSURE

A chemical process for making block copolymers, which includes the steps of preparing a living block copolymer by anionic polymerization, e.g. using a lithium hydrocarbyl as initiator, and reacting the living block copolymer with either carbon dioxide, carbonyl sulphide or carbon disulphide to couple the block copolymer molecules through their live ends.

---

This invention relates to a process for the preparation of block copolymers.

Block copolymers and polymers in which the macromolecules comprise discreet polymeric segments, each segment being joined at one or each linear end to another discreet polymeric segment. Each segment may be a homopolymer or may be a random copolymer of two or more different monomeric units. Different segments may be polymers of the same monomer, and differ from each other only in the microstructure of the monomeric units.

Block copolymers, of two or more monomers have recently assumed importance, as they exhibit properties which are different from the homopolymers of the monomers of which they are composed and from the conventional random copolymers of the same monomers. In some cases, the block copolymers exhibit properties which are a combination of or intermediate between those of homopolymers of the individual monomers.

Of particular interest among block copolymers are those which comprise three blocks, the centre block being composed of a rubbery polymer and each terminal block being composed of a plastic polymer, for example block copolymers of form polystyrene-polybutadiene-polystyrene. Such block copolymers have some properties characteristic of a plastic and some properties characteristic of a rubber. Thus the materials are thermoplastic and can be moulded at elevated temperatures. The materials are also rubbery and do not require vulcanization or curing, as is the case with natural rubber and conventional synthetic rubbers, before exhibiting their rubbery properties such as high elasticity, high elongation at break and high tensile strength.

Such block copolymers are normally prepared by the "living polymer" or "step-wise-addition" technique. This technique involves the polymerization of a first monomer by anionic polymerization in solution, using a suitable initiator of anionic polymerization such as sodium-naphthalene or butyl lithium, until complete conversion of monomer to polymer has been achieved. When a mono-functional initiator such as butyl lithium is employed, the result is a "living polymer" so called because it has a terminal atom carrying a negative charge or "live" end. Then, without killing the living polymer so formed, the second monomer is added to the reaction solution, and polymerization of this second monomer onto the live end of the previously formed living polymer is initiated by the living polymer itself. After complete polymerization of the second monomer, a two-block copolymer has been formed, and a copolymer having the desired number of blocks can be prepared by repeating the steps as necessary, provided only that the preformed polymer is not killed at any stage of the process.

When a di-functional initiator such as dilithio-diisoprene is used, the living polymer produced after the first step of the process has two live ends. Subsequent additions of the second monomer to this living polymer will cause polymerization onto both of these live ends, forming a three-block copolymer. The process can of course be repeated, in this case to produce five, seven, etc., block copolymers.

There are however certain disadvantages in such a process. For example, the process is time-consuming, as after each addition of monomer sufficient time must elapse for the complete polymerization of the added monomer to form a block. Further, when preparing high molecular wieght block copolymers by this method, the solution attains a high viscosity, which makes thorough mixing of the solution during the later stages, such as an addition of the last monomer, difficult. This problem is accentuated when, as is usual, the process is carried out in a non-polar solvent, due to the tendency of living polymer molecules to dimerize in such solutions. Moreover, each addition of monomer to the solution entails the risk of introducing impurities which may kill the living polymers, and it is therefore desirable that the number of such additions be kept down to a minimum.

It is an object of the present invention to provide a process of preparing block copolymers which overcomes or reduces these disadvantages.

From its broadest aspect, the present invention provides a process for preparing multi-block copolymers which comprises the steps of polymerizing to substantial completion a first monomer by anionic polymerization in solution in an inert organic solvent, adding to the living homopolymer so formed a second monomer and allowing said second monomer to polymerize to substantial completion onto the end of the said homopolymer, and coupling the living block copolymer formed by reacting the live ends thereof with a coupling reagent comprising carbon dioxide, carbonyl sulphide or carbon disulphide.

Preferably the process of the invention is used to prepare three-block copolymers of form polystyrene-polybutadiene-polystyrene, the first monomer being styrene and the second monomer being butadiene. After the first step of the process a live polymer of styrene is formed, and after the second step of the process a living two-block copolymer of form polystyrene-polybutadiene* (where * denotes a live polymer end) is formed. It appears that subsequent treatment of the solution of such living two-block copolymers with a coupling reagent of the group hereinbefore defined causes coupling of the polymer molecules by reaction of the live ends with the reagent. The final product is thus a three-block copolymer of form polystyrene-polybutadiene-polystyrene. The polybutadiene block may contain a residue of the reagent used somewhere along its length. Such polymers show remarkable strength and elastic properties in the uncured or "green" state, as well as thermoplastic properties. Other elastomer-forming monomers such as isoprene or piperylene may be substituted for the butadiene. Similarly other thermoplastic-forming monomers such as vinyl toluene may be substituted for styrene.

The intermediate formation of living polymers is preferably carried out in a non-polar hydrocarbon solvent. Particularly suitable such solvents are benzene, toluene, xylene, pentane, hexane, cyclohexane and heptane. Inert polar organic solvents such as tetrahydrofuran may also be used, but are inferior in certain respects. The amount of solvent used depends upon the amount of monomer to be polymerized, and is chosen to give a suitable solution viscosity. The suitable initiators of anionic polymerization for preparing the living polymers will be well known to those skilled in the art, and include generally organo-metallic compounds of alkali metals. Preferred initiators are lithium hydrocarbyls such as methyl lithium, isopropyl lithium, n-butyl lithium, sec-butyl lithium, tertiary octyl lithium, n-decyl lithium, phenyl lithium, naphthyl lithium, 4-butyl phenyl lithium, cyclohexyl lithium, 4-phenyl butyl lithium, 1-tolyl lithium, 4-butyl cyclohexyl lithium, and 4-cyclohexyl butyl lithium. Sodium compounds such as sodium alkyls, sodium-naphthalene and sodium-alpha methyl styrene tetramer are also useful.

Alternatively, dialkali metal compounds such as dilithiodiisoprene, dilithium-stilbene, dilithio-methane and 1,4-dilithiobutane may be used. When working with such di-functional initiators it appears that each polymer chain has two live ends. Thus, after polymerizing the first monomer, which may be butadiene, a polymer of form *(polybutadiene)* is formed. Subsequent addition of second monomer such as styrene will lead to polymerization of the second monomer onto each end of the polybutadiene, to give a block copolymer of form *polystyrene-polybutadiene-polystyrene*. However, the results when working with di-functional initiators appear to be complicated by other factors, one of which may be the effect of the organic fragment of the initiator, which is liable to attach to one live end of the polymer thereby making the two live ends somewhat different in chemical nature. Thus, for simplicity and ready reproducibility of results, it is preferred to use mono-lithium compounds, especially n-butyl lithium or sec-butyl lithium.

The amount of initiator used per unit of monomer may vary over a wide range, and may be selected on the basis of the desired molecular weight of the first polymer block. Thus assuming that each organometallic molecule added causes initiation of one polymer chain, and that initiation can occur only by the use of an organo-metallic molecule, the mole ratio of alkali metal to monomer determines the molecular weight of the polymer. First polymer blocks of molecular weight about 1,000 to about 500,000 or higher can be produced by this method. Theoretically, to obtain a polymer of butadiene of molecular weight of 1,000 using a convenient experimental charge of monomer, such as one mole (54 grams), one thus requires $54 \times 10^{-3}$ moles of monofunctional initiator. Theoretically, to obtain a polymer of butadiene of molecular weight 500,000 from the same amount of monomer, one would require $10.3 \times 10^{-5}$ moles of mono-functional initiator.

The formation of the two-block copolymer must be carried out in an inert atmosphere. This is conveniently accomplished by sweeping out the reaction zone with an inert gas such as nitrogen, and carrying out the reaction in an atmosphere of nitrogen. Water should of course be excluded from the reaction zone, otherwise the initiator will be wholly or partially deactivated, and the living polymer will be killed. Thus all reagents used should be anhydrous and the reaction vessels thoroughly dried before the process commences. Precautions should also be taken to prevent ingress of water into the reaction zone during the process.

The temperature of polymerization to form the two-block copolymer may vary over a wide range. Factors to be considered when choosing the reaction temperature are the rate of reaction, which varies with the chosen initiator and monomer system as well as with temperature, and the nature of the solvent, which must be kept in liquid form. When a solution of benzene or toluene is used and the monomers are butadiene and styrene, a temperature of between about 20° C. and 70° C. is satisfactory. Depending upon the other factors detailed above however, temperatures as low as —40° C. and as high as 100° C. may be used.

After the second monomer has been polymerized substantially to completion, the solution containing the living two-block copolymer is treated with the coupling reagent, either carbon dioxide, carbonyl sulphide or carbon disulphide or mixtures of these. The effect of such a reagent appears to be the coupling of living polymer molecules through their live ends, as shown by an increase in intrinsic viscosity (i.e. molecular weight of the polymer).

When the coupling reagent is a gas it may be injected into the solution of live polymer or it may be introduced into the space above the living polymer solution. When the coupling agent is a liquid it is added directly to the living polymer solution.

The amount of reagent required is best expressed in relation to the amount of initiator used, which theoretically corresponds to the number of live polymer ends present in the solution. It has been found that ratios as low as reagent:lithium of 0.25:1 and as high as 5:1 are effective in producing useful products by the process of the invention. For best results, the reagent should be added slowly to the polymer solution, to minimize the incidence of undesirable side reactions.

Preferably, the coupling reaction is carried out at or near room temperature, although this does not appear to be critical, provided that the temperature is above about —10° C. Lower temperatures and the use of coupling reagents in the solid form such as Dry Ice should be avoided, otherwise undesirable side reactions seem to occur.

Best results are obtained when the coupling reaction is carried out with the living polymer dissolved in a non-polar liquid hydrocarbon solvent. It is believed that the reason for this is that the living polymer molecules associate into pairs with their living ends in juxtaposition in such solvents, thus making the coupling of two molecules by the coupling reagent easier. The coupling reaction with these reagents is extremely rapid and is accompanied by a discoloration of the polymer solution.

The invention will now be more fully described by means of practical examples.

EXAMPLE I

In this example a three-block copolymer of general form polystyrene-polybutadiene-polystyrene was prepared in Bottle A, using gaseous carbon dioxide as the coupling reagent. Bottle B was a control bottle which differed only from Bottle A in that no carbon dioxide was added. All reagents were carefully dried before use and the process was carried out in an atmosphere of nitrogen.

Into each carefully dried, 30-ounce polymerization bottle the following recipe was charged in the following order:

Benzene: 500 mls.
Styrene: 20 mls.
N-butyl lithium: 2.3 millimoles

The styrene was polymerized substantially to completion (one hour) at 50° C., the polymerization bottles during this time being rotated end over end in a water bath maintained at this temperature.

Sixty mls. of butadiene was then added by means of injection with a hypodermic needle through the self-sealing rubber cap of the polymerization bottle. Polymerization was allowed to proceed in the same manner and at the same temperature until all the butadiene had polymerized (1½ hours). The bottles were then cooled to room temperature (23.5° C.) and 35 mls. of carbon dioxide gas was injected into Bottle A. This bottle was then vigorously shaken. The polymers from each bottle were then killed and extracted with a methanol mixture, dried and pressed into films.

For testing purposes microdumbells of thickness 0.025 inch and width 0.10 inch were prepared from the dried polymer films, and subjected to strength tests. The results are recorded in Table I.

TABLE I

| Bottle | A | B |
|---|---|---|
| Amount of $CO_2$ added (mls.) | 35 | 0 |
| Molar ratio $CO_2$/Li | 0.60 | |
| Intrinsic viscosity after $CO_2$ addition | 0.951 | 0.553 |
| Estimated molecular weight | 115,000 | 52,000 |
| Percent solubility | 100 | 98.7 |
| Tensile strength, p.s.i. (25° C.) | 3,780 | |
| Elongation at break (percent) | 960 | |
| 100% modulus (p.s.i.) | 300 | |
| 300% modulus (p.s.i.) | 375 | |

The sample from Bottle B broke at about 20% elongation. However, the tests on the sample from Bottle A indicate that it is suitable for use as an elastomer without curing.

EXAMPLES II TO VIII

In these examples, three-block copolymers of general form polystyrene-polybutadiene-polystyrene were prepared, using gaseous carbon dioxide as the coupling agent. The polymerization process in each example was the same as in Example I, the experiments differing from each other only in the ratio of coupling reagent to initiator.

The initial charge recipe in each example was as follows:

Benzene: 400 mls.
Styrene: 20 mls.
N-butyl lithium: 1.85 millimoles

After substantially complete polymerization of the styrene (one hour) at 50° C., 60 mls. of butadiene was added to each bottle. Polymerization was allowed to proceed at the same temperature until all the butadiene had polymerized (1½ hours). The bottles were then cooled to room temperature (26.5° C.) and a measured quantity of carbon dioxide gas was fed into the polymer solution. After the addition of carbon dioxide and subsequent vigorous shaking, the resultant polymer was killed, extracted and test samples prepared, as in Example I. The results of the tests performed on the samples are recorded in Table II.

TABLE II

| Example | Amount of $CO_2$ added, mls. | Molar ratio $CO_2$/Li | Intrinsic viscosity after $CO_2$ addition | Estimated molecular weight | Percent solubility | Tensile strength, p.s.i. (25° C.) | Elongation at break, percent | 100% modulus, p.s.i. | 300% modulus, p.s.i. |
|---|---|---|---|---|---|---|---|---|---|
| 2 | 100 | 2.2 | 1.01 | 120,000 | 98.6 | 3,655 | 990 | 300 | 385 |
| 3 | 75 | 1.7 | 1.28 | 160,000 | 99.2 | 2,835 | 980 | 290 | 375 |
| 4 | 50 | 1.1 | 1.04 | 120,000 | 99.5 | 3,725 | 925 | 325 | 400 |
| 5 | 40 | 0.85 | 1.05 | 120,000 | 100 | 3,140 | 855 | 315 | 410 |
| 6 | 30 | 0.65 | 1.09 | 130,000 | 100 | 3,660 | 905 | 295 | 365 |
| 7 | 20 | 0.45 | 1.32 | 170,000 | 99.6 | 2,945 | 825 | 290 | 370 |
| 8 | 0 | | 0.874 | 80,000 | 99.0 | 145 | 35 | | |

Example VIII is a control polymer to which no carbon dioxide was added and was run for purposes of comparison. As can be seen from the table of results the sample from this bottle had extremely low strength properties.

EXAMPLES IX TO XII

This series of examples is similar to Examples II to VIII, except that the charge recipe was varied slightly to obtain polymers of lower molecular weight before coupling with carbon dioxide.

The ingredients for each polymerization bottle were as follows:

Benzene: 400 mls.
Styrene: 15 mls.
N-butyl lithium: 1.85 millimoles
    Polymerize
Butadiene: 45 mls.

Tests were carried out as previously described, and the results are recorded in Table III.

TABLE III

| Example | IX | X | XI | XII |
|---|---|---|---|---|
| Amount of $CO_2$ added (mls.) | 40 | 30 | 20 | 0 |
| Molar ratio $CO_2$/Li | 0.94 | 0.77 | 0.46 | |
| Intrinsic viscosity after $CO_2$ addition | 1.09 | 0.92 | 0.89 | 0.56 |
| Estimated molecular weight | 130,000 | 110,000 | 110,000 | 52,000 |
| Percent solubility | 97.8 | 99.4 | 98.4 | 96.4 |
| Tensile strength, p.s.i. (25° C.) | 2,995 | 3,030 | 1,290 | |
| Elongation at break, percent | 875 | 1,000 | 725 | 10 |
| 100% modulus (p.s.i.) | 270 | 275 | 400 | |
| 300% modulus (p.s.i.) | 360 | 375 | 540 | |

Once again the control bottle, Example XII, yielded a polymer having very little strength, and which was too weak to give results to the physical tests.

EXAMPLES XIII AND XIV

In these examples, three-block copolymers of form polystyrene-polybutadiene-polystyrene were prepared on a larger scale, by coupling with carbon dioxide as in the previous examples. In Example XIV a large excess of carbon dioxide was used. The amount of ingredients used and the physical test results are recorded in Table IV. The procedure was the same as that described for Example I.

TABLE IV

| Example | XIII | XIV |
|---|---|---|
| Benzene (mls.) | 1,500 | 1,500 |
| Styrene (mls.) | 75 | 75 |
| N-butyl lithium (millimoles) | 6.9 | 6.9 |
| Butadiene (mls.) | 200 | 180 |
| Carbon dioxide (mls.) | 150 | |
| $CO_2$/Li molar ratio | 0.9 | >5 |
| Intrinsic viscosity after $CO_2$ addition | 0.89 | 0.85 |
| Estimated molecular weight | 85,000 | 85,000 |
| Percent solubility | 99.7 | 100 |
| Tensile strength (p.s.i.) at 25° C | 3,520 | 2,500 |
| Elongation at break, percent | 875 | 995 |
| 100% modulus, p.s.i | 335 | 360 |
| 300% modulus, p.s.i | 540 | 395 |

EXAMPLE XV

In this example, three-block copolymers of form polystyrene-polybutadiene-polystyrene were prepared, by forming a living two-block copolymer as in Example I and then adding carbon disulphide to effect coupling. The charge recipes in each run and the strength properties of the polymers produced (measured as in Example I) are given in Table V.

TABLE V

| Run | A | B |
|---|---|---|
| Benzene (mls.) | 300 | 300 |
| Styrene (mls.) | 83.5 | 83.5 |
| N-butyl lithium (millimoles) | 4 | 4 |
| Butadiene (mls.) | 62.5 | 62.5 |
| $CS_2$/Li ratio | 0.25/1 | 0.5/1 |
| Intrinsic viscosity before coupling | 0.34 | 0.34 |
| Estimated molecular weight before coupling | 29,000 | 29,000 |
| Intrinsic viscosity after coupling | 0.52 | 0.60 |
| Estimated molecular wt. after coupling | 51,000 | 54,000 |
| Tensile strength at 25° C. (p.s.i.) | 2,145 | 2,885 |
| Elongation at break, percent | 715 | 695 |
| 300% modulus, p.s.i | 705 | 875 |

EXAMPLE XVI

In this example three-block copolymers of general form polystyrene-polybutadiene-polystyrene were prepared, by preparing living two-block copolymers as described in Example I, and subsequently adding carbonyl sulphide, COS, to couple the blocks. Carbonyl sulphide is a gas under normal conditions of temperature and pressure.

The resultant products were subjected to physical strength tests as previously described, and the results together with the charge recipe for each run are recorded in Table VI.

TABLE VI

| Run | A | B | C |
|---|---|---|---|
| Benzene (mls.) | 300 | 300 | 300 |
| Styrene (mls.) | 40 | 40 | 40 |
| N-butyl lithium (millimoles) | 4 | 4 | 4 |
| Butadiene (mls.) | 62.5 | 62.5 | 62.5 |
| Amount of COS added (millimoles) | 1.0 | 2.0 | 2.8 |
| Molar ration COS/Li | 0.25/1 | 0.5/1 | 0.7/1 |
| Intrinsic viscosity before COS addition | 0.36 | 0.32 | 0.33 |
| Estimated molecular wt. before COS addition | 30,000 | 28,000 | 29,000 |
| Intrinsic viscosity after COS addition | 0.59 | 0.54 | 0.50 |
| Estimated molecular wt. after COS addition | 54,000 | 52,000 | 50,000 |
| Tensile strength (p.s.i.) | 4,195 | 3,450 | 3,845 |
| Elongation at break, percent | 840 | 710 | 780 |

The products of all the above examples were found to have physical strength properties in the uncured state, as shown in the various tables of results, high enough to make then useful as elastomers without the need for curing. Also, the products were sufficiently thermoplastic to be capable of being moulded into various shapes at elevated temperatures, in conventional moulding equipment. The products were white, generally translucent solids, and had the appearance and feel of normal thermoplastic polymers.

It will be readily apparent to those skilled in the art that block copolymers having 5, 7 or even more blocks may be produced by the process of the invention, by further additions of monomers after the formation of living two-block copolymers and substantially complete polymerization of such monomers before reaction with the coupling reagent.

What is claimed is:

1. A process of preparing multi-block copolymers, which comprises the steps of polymerizing to substantial completion a mono-alkenyl substituted aromatic hydrocarbon monomer by means of a monofunctional sodium or lithium hydrocarbyl initiator in solution in an inert organic solvent, adding to the solution of monofunctional living homopolymer so formed a conjugated diolefinic monomer and allowing the conjugated diolefinic monomer to polymerize to substantial completion onto said homopolymer, and coupling the monofunctional living block copolymer so formed with carbonyl sulphide, the mole ratio of carbonyl sulphide to sodium or lithium added in the polymerization initiator being from 0.25:1 to 5:1, said coupling being effected at a temperature of from $-10°$ C. to $60°$ C. while said living block copolymer is dissolved in a substantially non-polar liquid hydrocarbon solvent.

2. The process of claim 1 wherein the initiator is selected from n-butyl lithium and sec-butyl lithium, and said solvent is selected from n-hexane, cyclohexane, heptane, benzene and toluene.

3. The process of claim 2 wherein the mono-alkenyl substituted aromatic hydrocarbon monomer is styrene and the conjugated diolefinic monomer is butadiene.

References Cited

UNITED STATES PATENTS

| 3,135,716 | 6/1964 | Uraneck et al. | 260—880B |
| 3,150,209 | 9/1964 | Short et al. | 260—880B |
| 3,231,635 | 1/1966 | Holden et al. | 260—876B |
| 3,349,071 | 10/1967 | Strobel | 260—94.7 |
| 3,427,364 | 2/1969 | Shaw et al. | 260—879 |

JAMES A. SEIDLECK, Primary Examiner

U.S. Cl. X.R.

260—85.1, 94.7, 880